United States Patent [19]

Riegel

[11] Patent Number: 4,922,344
[45] Date of Patent: May 1, 1990

[54] CIRCUIT ARRANGEMENT FOR EVALUATING A VIDEO SYNCHRONIZING SIGNAL

[75] Inventor: Maximilian Riegel, Nuremberg, Fed. Rep. of Germany

[73] Assignee: U.S. Philips Corporation, New York, N.Y.

[21] Appl. No.: 316,391

[22] Filed: Feb. 27, 1989

[30] Foreign Application Priority Data

Mar. 18, 1988 [DE] Fed. Rep. of Germany ....... 3809076

[51] Int. Cl.$^5$ .............................................. H04N 5/04
[52] U.S. Cl. .................................. 358/152; 358/148; 358/150; 358/154
[58] Field of Search ............... 358/148, 149, 150, 153, 358/154, 158, 152; 307/517, 518; 328/110, 109; 377/20, 44

[56] References Cited

U.S. PATENT DOCUMENTS

| | | | |
|---|---|---|---|
| 3,382,320 | 5/1968 | Baldwin et al. | 358/152 |
| 3,531,593 | 9/1970 | Bell | 358/152 |
| 4,414,570 | 11/1983 | Braune et al. | 358/154 |
| 4,459,612 | 7/1984 | Shinkai et al. | 358/154 |
| 4,683,495 | 7/1987 | Brock | 358/150 |
| 4,701,799 | 10/1987 | Yoshimura | 358/152 |
| 4,827,341 | 5/1989 | Akimoto et al. | 358/158 |

Primary Examiner—John W. Shepperd
Assistant Examiner—Michael D. Parker
Attorney, Agent, or Firm—Edward W. Goodman

[57] ABSTRACT

A circuit arrangement for evaluating a video synchronizing signal formed by line synchronizing pulses whose regular sequence between two fields is interrupted by a field synchronizing pulse and the time interval between the edges of a field synchronizing signal and the edges of a subsequent first line synchronizing pulse is characteristic of each field. In the circuit arrangement the evaluation of the video synchronizing signal is based on a field synchronizing pulse and the line synchronizing pulses subsequent thereto. This evaluation is effected by a detector, which detects the field synchronizing pulses in the video synchronizing signal. The circuit arrangement, a first logic circuit which is connected to the output of the detector and which the operation of a first counter clocked by an oscillator is controlled, two decoders connected to the counting stages of the first counter and supplying an output pulse, as long as the counter position cycles throug a predetermined counting range for each decoder, and a second logic circuit connected to the decoders. Also the video synchronizing signal is applied to this logic circuit. From their output variables it cna be recognized whether one of the two decoders and which one of the two decoders has supplied an output pulse during a pulse in the video synchronizing signal.

3 Claims, 1 Drawing Sheet

CIRCUIT ARRANGEMENT FOR EVALUATING A VIDEO SYNCHRONIZING SIGNAL

BACKGROUND OF THE INVENTION

1. Field of the Invention

The invention relates to a circuit arrangement for evaluating a video synchronizing signal formed by line synchronizing pulses whose regular sequence is interrupted between two fields by a field synchronizing pulse and in which the time interval between the edges of a field synchronizing pulse and the edges of the subsequent field synchronizing pulse is characteristic of each field.

2. Description of Related Art

Such a circuit arrangement is disclosed in U.S. Pat. No. 4,683,495 (PHD 84.160); it is utilized in, for example, the coding of video signals. Its main object is to recognize in video synchronizing signals, the line synchronizing pulses, the field synchronizing pulses and also the fields and to produce control signals therefrom, with which the coding procedure is controlled.

The prior art arrangement produces two separate signals, namely a field signal and a field synchronizing signal. Using the arrangement, the pulse intervals between what are commonly referred to as pre-equalizing pulses in a video synchronizing signal are measured. The pre-equalizing pulses are located between the last line synchronizing pulse of a field and a picture frequency pulse. The pulse intervals measured are characteristic of each field.

Thus, in the prior art arrangement, the pulse interval sequence before a field synchronizing signal is utilized to recognize the number of a field. When applied to video signals which are supplied by, for example, a video recorder, this has however the disadvantage that the probability of faulty control signals being supplied is very great. The reason therefore is that with these signals, strong disturbances often occur at the end of a field, so that also the pulse interval sequence before the field synchronizing pulse is involved in the procedure on which the mode of operation of the prior art arrangement is based.

SUMMARY OF THE INVENTION

The invention has for its object to provide a circuit arrangement having the features described in the opening paragraph, in which the evaluation of the video synchronizing signals is based on a field synchronizing pulse and on the line synchronizing pulses which follow after the field synchronizing pulse.

The circuit arrangement is therefore characterized by 1.1 a detector for detecting the field synchronizing pulse in the video synchronizing pulse, 1.2 a first logic circuit connected to the output of the detector for controlling the operation of a counter clocked by an oscillator, 1.3 two decoders connected to the counting stages of the counter for supplying an output pulse, as long as the counter position cycles through a counting range which is predetermined for each decoder, 1.4 a second logic circuit connected to the decoders and to which also the video synchronizing signal is applied and from whose output variables it can be recognized whether one of the two decoders and which one of the two decoders has supplied an output pulse during a pulse in the video synchronizing signal.

The counter, mentioned to accomplish the object of the invention and the decoder connected thereto, produce, with the aid of the first logic circuit, two different time windows of a defined width and a defined relative position as regards a field synchronizing pulse. Said second logic circuit is a coincidence circuit which indicates whether and in which time window a pulse of the video synchronizing signal falls. When the video synchronizing signal is free from interferences, then the answer to the question in which time window an occurring pulse has fallen is at the same time an answer to the question which field is involved, as the occurring pulse can only have been a line synchronizing pulse, whose spacing from a field synchronizing pulse is, as is a condition, characteristic of each field.

An advantageous embodiment consists of that the first logic circuit is constituted by a gate which supplies a pulse when a pulse is present at the output of the detector or when predetermined binary value are stored in selected counting stages of the counter, the counter being operative during these pulses, whereby in contrast whereto, when such a pulse is absent, the counter is loaded with a number which results in the storage of binary values other than the predetermined binary values stored in the selected counting stages.

Utilizing this embodiment it is possible to disregard pulses at the output of the detector as being interfering pulses as long as their length is below a minimum length.

BRIEF DESCRIPTION OF THE DRAWING

The invention and how it can be put into effect will now be described in greater detail with reference to the accompanying Figures.

In the drawing.

DESCRIPTION OF THE PREFERRED EMBODIMENT

Figure 1A:
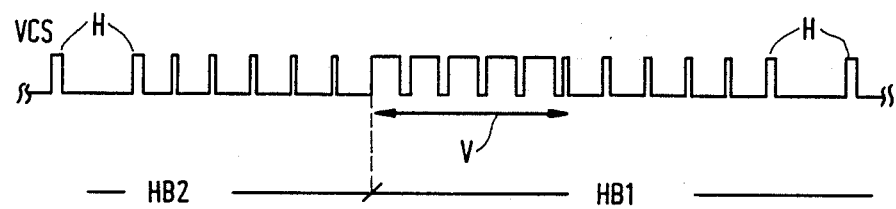
FIGS. 1a and 1b show sections of a video synchronizing signal.
Figure 1B:
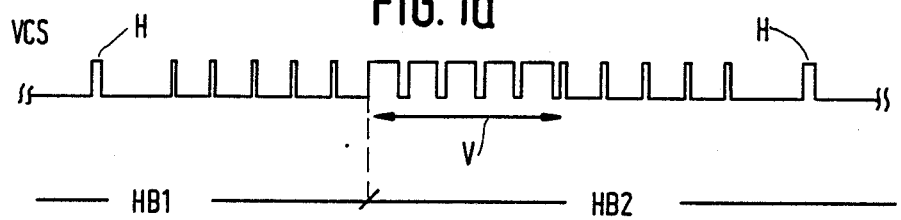

The time diagrams (a) and (b) of FIG. 1 are sections from a video synchronizing signal VCS which corresponds to the European CCIR standard. The diagrams are shifted through half a field period relative to each other. The diagram (a) shows the structure of the video synchronizing signal VCS at the change from a second field HB2 to a first field HB1, and the diagram (b) showss the opposite change. Each field starts with a modulated field synchronizing pulse V. Before and after the field synchronizing pulse V the video synchronizing signal contains five equalizing pulses (pre-equalizing and post-equalizing pulses); then the line synchronizing pulses H follow with a constant spacing from each other. As a comparison between the diagrams (a) and (b) shows, the line synchronizing pulses H of the first field HB1 have a different time spacing from a field synchronizing pulse V as the line synchronizing pulse H of the second field HB2.

Separating the video synchronizing signal from a video signal is a procedure known to a person skilled in the art, and is described in, for example, DE 2349684 B2 (PHN 6668).

Figure 2:
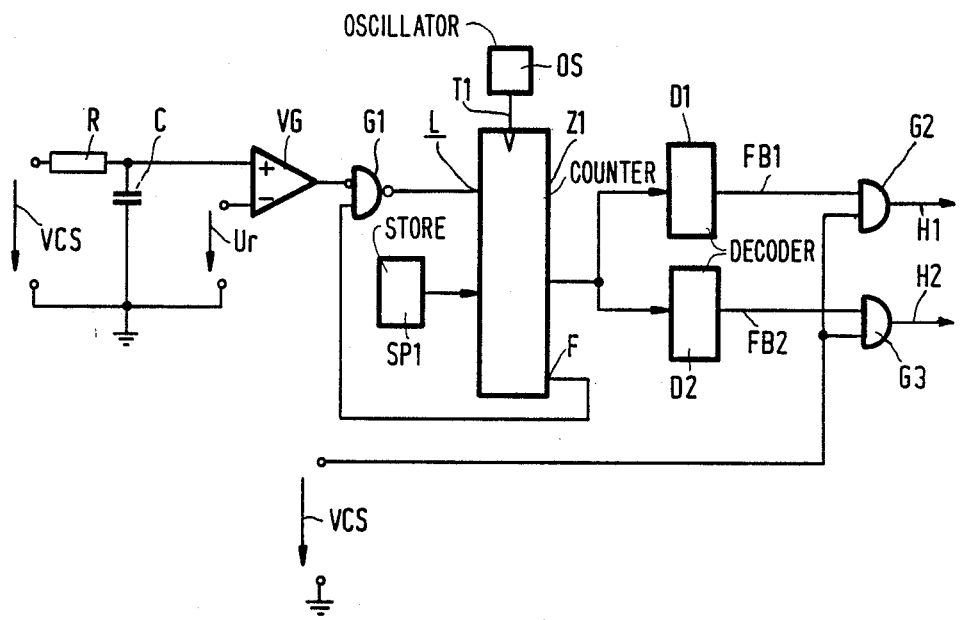
FIG. 2 shows an evaluation circuit according to the invention.

With a circuit as shown in FIG. 2, a signal is recovered which indicates the number of the field of a video image. If the first field HB1 of a video image is present, then on a line H1 a pulse appears which has a length of a line synchronizing pulse H, in the other case, a pulse of the same length appears on a line H2, it being assumed that the video synchronizing signal VCS is undisturbed.

A detector, by means of which the field synchronizing pulses V are detected, is connected to the input of the circuit. The detector is formed by an RC-network comprising a resistor R and a capacitor C and also a subsequent comparator VG which compares the voltage at capacitor C with a reference voltage Ur. A logic circuit, which in the present embodiment is constituted by a NAND-gate G1 with an inverting input, controls the counting cycle of a counter Z1 which is clocked by the clock T1 of an oscillator OS. The frequency of the oscillator OS determines the resolution with respect to time of the arrangement the frequency must be chosen that high so, for example, two line synchronizing pulses H can still be distinguished from each other.

The presence of a pulse, the signal having the state HIGH, and the absence of a pulse, the signal having the state LOW, will now be described.

If the output of the comparator VG is in the HIGH state—which is an indication that the detector has detected a pulse of a longer duration in the video synchronizing signal VCS—then also the output of the gate G1 is adjusted to the HIGH state.

Because of the connection of the gate output to the enable input L of the counter Z1, the counting procedure—so when the input L is in the HIGH state—is started. It starts at a binary number which is stored in a store SP1 and with which the counter $Z_1$, has been loaded to an instant defined herebelow. This number has been chosen such that at the output F of the logic combination of selected counter stages of the counter Z1, it results in the HIGH signal state. This state keeps the gate G1 in the open state for the pulses at the output of the comparator VG. Consequently, the counter Z1 is operative for at least a period of time equal to the duration of the pulse at the output of the comparator VG and the signal state at the output F has not yet changed from HIGH to LOW in response to the counting procedure. If the pulse at the output of the comparator VG ends before the change, then the signal at the input L changes from HIGH to LOW. This results in the counting procedure being interrupted and the number stored in the store SP1 being transferred to the counter at the next clock pulse from the oscillator OS; the initial state, that is to say the state before the occurrence of the pulse at the output of the comparator VG, is re-instated again. Pulses at the output of the comparator VG which do not exceed a minimum duration are consequently not taken into account; they are considered as interference pulses.

If the minimum duration is exceeded, the signal state at the output F changes from HIGH to LOW. The LOW state closes the gate G1 for pulses coming from the output of the comparator VG. The counter Z1 continues operation, irrespective of signal changes at the output of the comparator VG, until the output F is adjusted to the HIGH state by the counting procedure.

Within the overall number of counting positions cycled through as long as the output F is in the LOW state, there are two separate ranges of counter positions, in which the output signal FB1 of a first decoder D1 or the output signal FB2 of a second decoder D2, respectively, assume the HIGH state. The inputs of the two decoders D1 and D2 are connected to the stages of the counter Z1. Each counting range has been chosen such that in undisturbed operation it precisely contains a line synchronizing pulse H, more specifically a line synchronizing pulse H of a first field HB1 in the first counting range and a line synchronizing pulse H of a second field HB2 in the second counting range.

AND-gates G2, G3 of a second logic circuit are made conductive by the HIGH states of the signals FB1 and FB2. The video synchronizing signal VCS is also applied to the gates G2 and G3.

During undisturbed operation pulses appear on the output line H1 of the gate G2 with a time spacing of a full picture. Each of these pulses indicates that data about the first field HB1 are just present at the input of the circuit. A similar situation holds for an output line H2, the gate G3 and the second field HB2.

The procedure described in the foregoing will now be put in a concrete form with reference to a numerical example. In accordance with is example, the clock T1 of the oscillator OS has a pulse rate of 2.5 MHz or a period length of 0.4 $\mu$s. The time interval between two line synchronizing pulses H as shown in FIG. 1 is 64 $\mu$s, i.e. 160 periods of the clock T1. The width of a line synchronizing pulse H has a duration of 4.7 $\mu$s, i.e. approximately 12 periods of the clock T1. The windows have a width of 64 periods of the clock T1 and are positioned such that the center of a window coincides with the center of a line synchronizing pulse H, it being assumed that the line synchronizing pulse is located in its desired position. The counter Z1 is a 12-stage counter which—provided it is not prevented from doing so by control signals—cycles through its counting range. In the present example, a cascade arrangement of three 74163-type counters was chosen for the counter.

The following binary numbers play a special part in the counting cycle of the counter Z1:

| a1: | 1111 | 0011 | 0000 |
| a2: | 0000 | 0000 | 0000 |
| a3: | 0100 | 0100 | 0000 |
| a4: | 0100 | 0111 | 1111 |
| a5: | 0100 | 1000 | 0000 |
| a6: | 0100 | 1011 | 1111 |
| a7: | 1111 | 0000 | 0000 |

The number a1 is the number stored in the store SP1. The criterion for opening the gate G1 is the simultaneous occurrence of four initial ones in all the numbers through which the counter Z1 cycles in the course of the counting procedure. When the number a2 is reached, the gate G1 is closed, as then for the first time four ones do not occur in the initial positions. The counter then continues counting independently of the signal states at the output of the comparator VG. At the number a3 the signal FB1 changes to the HIGH state and consequently opens the window for the ninth line synchronizing pulse H of the first field HB1 after the field synchronizing pulse V; the number a4 closes this window, the signal FB1 consequently returns to the LOW state. On reaching the number a5 the signal FB2 is adjusted to the HIGH state; the window for the ninth line synchronizing pulse H of the second field HB2 is opened and closed again at a6. On reaching the number a7 the gate G1 is opened for pulses at the output of the comparator VG. If a pulse is present, it can only be an interference pulse. If its length exceeds 256 periods of the clock T1, then a faulty synchronization is unavoidable, provided this is not recognized and corrected at the signals on the lines H1 and H2 by a subsequent circuit.

In the opposite case—so when the interfering pulse is shorter—the counter Z1 is again charged with the number a1 at the end of this shorter interference pulse. At the next occurrence of a pulse, the counter then starts counting upwards from A1 onwards.

I claim:

1. A circuit arrangement for evaluating a video synchronizing signal formed by line synchronizing pulses whose regular sequence is interrupted between two fields by a field synchronizing pulse and in which the time interval between the edges of a field synchronizing pulse and the edges of the subsequent line synchronizing pulse is characteristic of each field, characterized by 1.1 a detector for detecting the field synchronizing pulse in the video synchronizing signal, 1.2 a first logic circuit which is connected to the output of the detector for controlling the operation of a counter clocked by an oscillator, 1.3 two decoders (D1, D2) connected to the counting stages of the counter for supplying a output pulse, as long as the counter position cycles through a counting range which is predetermined for each decoder, 1.4 a second logic circuit connected to the decoders, to which also the video synchronizing signal is applied and from whose output variables it can be recognized whether one of the two decoders and which one of the two decoders has supplied an output pulse during a pulse in the video synchronizing signal.

2. A circuit arrangement as claimed in claim 1, characterized, in that the first logic circuit is constituted by a gate, which supplies a pulse in the presence of a pulse at the output of the detector or when predetermined binary values are stored in selected counting stages of the counter, the counter being operative during this pulse, whereby in contrast whereto, in the absence of such a pulse, the counter is loaded with a number which results in the storage of binary values other than the predetermined binary values stored in the selected counting stages.

3. A circuit arrangement as claimed in claim 1 or 2, characterized, in that the second logic circuit is formed by two AND-gates each having two inputs, that each time one input of the AND-gate receives the video synchronizing signal and the other input of each one of the AND-gates is connected to the output of a decoder.

* * * * *